United States Patent [19]

Cobb

[11] 3,778,234

[45] Dec. 11, 1973

[54] PROCESS FOR GROWING CRYSTALS USING AN OZONE ENRICHED HYDROGEN-OXYGEN FLAME

[75] Inventor: Carolus Cobb, Arlington, Mass. 02139

[73] Assignee: American Science & Engineering, Inc., Cambridge, Mass.

[22] Filed: Feb. 14, 1972

[21] Appl. No.: 226,253

[52] U.S. Cl. ........ 252/301.4 R, 23/301 SP, 23/304, 23/305, C09k/1/62
[51] Int. Cl. ........................... C09k 1/10, B01j 17/24
[58] Field of Search ........................... 252/301.4 R; 23/273 V, 301 SP, 304, 305; 423/593, 624, 636

[56] References Cited
UNITED STATES PATENTS 3,224,840  12/1965  Lefever ..................... 23/301 SP X
3,607,111  9/1971  Adamski ......................... 23/273 V Primary Examiner—Oscar R. Vertiz
Assistant Examiner—J. Cooper
Attorney—Charles Hieken

[57]  ABSTRACT

A flame fusion process for the formation of high melting refractory oxide single crystals using a hydrogen-oxygen flame substantially enriched in ozone. The enrichment of the flame with ozone increases burning speed, thereby reducing flame size and increasing flame temperature. This produces a more closely confined flame area permitting the growth of new single crystalline materials, such as beryllium oxide, magnesium oxide, barium zirconate, calcium oxide, etc. Single crystals grown in accordance with this invention have utility as superior integrated circuit substrates and high energy solid state laser hosts.

3 Claims, 1 Drawing Figure

PATENTED DEC 11 1973 3,778,234
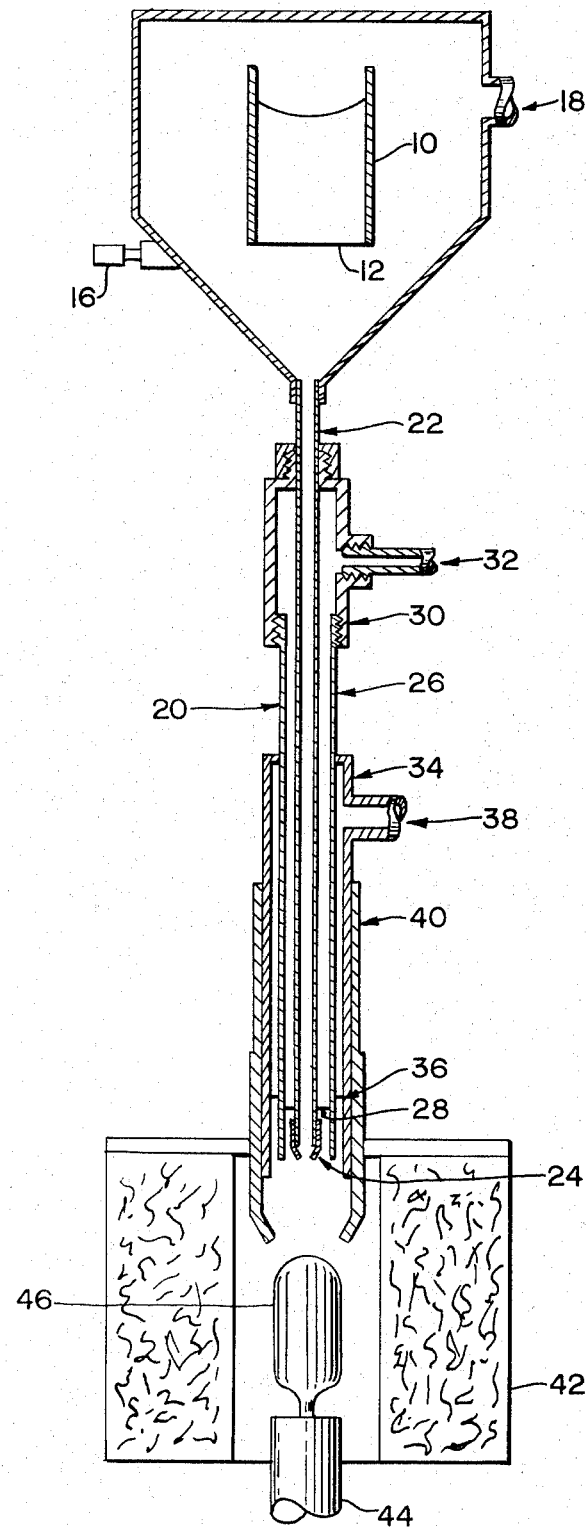
INVENTOR
CAROLUS M. COBB
BY Wolf, Greenfield & Hieken
ATTORNEYS

PROCESS FOR GROWING CRYSTALS USING AN OZONE ENRICHED HYDROGEN-OXYGEN FLAME

INTRODUCTION

This invention relates to single crystalline materials and has for an important object, a flame fusion process process for the formation of high melting single crystalline refractory metal oxides using a hydrogen-oxygen flame substantially enriched in ozone to increase the effective flame temperature.

BACKGROUND OF THE INVENTION

Flame fusion procedures for the growth of crystalline materials are known in the art and described in numerous publications including U.S. Pat. Nos. 988,230 and 3,224,840. Crystals are prepared by the controlled melting and recrystallization of a metal oxide. The process typically employs several vertical concentric tubes through which reactive gases, such as oxygen and hydrogen, are individually fed to the bottom of the tubes where they are mixed and ignited to produce a flame exhibiting concentric combustion zones. The raw materials for crystal growth, in the form of powders of the oxide constituents, are sifted through the flame and fall on a molten cap of a growing crystal supported on a pedestal within the flame. As the powders are passed through the flame, the pedestal is lowered and a molten boule is formed.

The flame temperature for the stoichiometric combustion of hydrogen and oxygen is approximately 2,815°C. However, radiation heat loss lowers the effective flame temperature for crystal growth to approximately 2,450°C. Consequently, single crystals of refractory metal oxides having a melting point in excess of that of yttrium oxide (2,417°C) cannot be formed by flame fusion techniques and are unavailable. Increased effective flame temperature in the flame fusion process would make available many new single crystalline materials suitable for applications such as substrates for integrated circuits and high performance solid state laser hosts.

SUMMARY OF THE INVENTION

According to the invention it has been discovered that enrichment of the oxygen gas stream in a hydrogen-oxygen flame with ozone increases the effective flame temperature in the flame fusion process by as much as 500°C dependent upon ozone concentration. The addition of ozone provides an additional source of heat and available oxygen atoms with increased burning rates and a smaller, more concentrated flame enabling better focusing of the flame energy on the growing crystal cap to overcome radiated heat loss. All of the technological advantages of the flame fusion process are retained. These include the reducing and oxidizing atmosphere necessary for metal oxide crystal growth, lack of turbulence in the growth zone thereby minimizing dislocations and dislocation structures in the crystals, rapid crystal growth rates, and large crystal sizes.

The primary reactions in the hydrogen-oxygen flame are believed to be as follows:

$OH + H_2 \rightarrow H_2O + H$
$H + O_2 \rightarrow OH + O$
$O + H_2 \rightarrow OH + H$ When the oxygen stream is enriched with ozone, the latter decomposes, providing heat and additional oxygen atoms according to the following equation:

$O_3 \rightarrow O_2 + O$

This substantially increases burning speeds without increasing flame size. Heat loss due to radiation can thus be overcome.

The concentration of ozone in the oxygen stream is not critical provided that sufficient ozone is present to maintain the effective flame temperature in excess of the melting point of the refractory metal oxide undergoing growth. Broadly, the concentration may vary between 1 mol percent of the total oxygen stream to 100 mol percent. When the concentration of ozone exceeds 44 mol percent, there is a danger of deflagration and 44 mol percent constitutes a preferred upper limit.

The use of a hydrogen-oxygen flame enriched in ozone permits, for the first time, the formation of single crystalline refractory metal oxides having a melting point in excess of that of yttrium oxide by a flame fusion process. However, the process is also applicable to the formation of lower melting refractory oxide single crystals such as aluminum oxide and yttrium oxide and has the advantage of faster crystal growth rates over processes using the conventional hydrogen-oxygen flame.

BRIEF DESCRIPTION OF THE DRAWING

The process for forming single crystalline materials in accordance with this invention will be better understood by reference to the specific examples which follow and the accompanying drawing, the single FIGURE of which shows a vertical view in cross section of a burner for growing single crystals adapted for the introduction of ozone.

DETAILED DESCRIPTION OF PREFERRED EMBODIMENTS

With reference to the drawing, there is shown a burner (20) having three concentric tubes of different diameters. The center tube (22) carrying the refractory metal oxide feed and an oxygen or oxygen mixture is fabricated from stainless steel and is fitted at its lower end with nozzle (24). The intermediate tube (26) which carries hydrogen may be constructed of stainless steel and has a baffle (28) pressed into its lower end. A series of holes (not shown) are drilled in the baffle permitting the concentric flow of hydrogen. The holes may vary in diameter and to some extent, diameter and spacing are dependent upon the ozone content of the gas stream. The inner tube and intermediate tube are held together by a specially constructed T (30). A small stainless steel side tube (32) provides a path for the entrance of hydrogen to intermediate tube (26).

The outer tube (34) carries oxygen or a mixture of oxygen and ozone and is provided with baffle (36) at its base having openings (not shown) permitting the flow of gasses. A small gas entry tube (38) is soldered onto the outer tube (34).

An air cooled sleeve (40) is placed over the lower end of outer tube (34). This sleeve may be positioned vertically along the tube until a desired flame pattern is obtained. It is adjusted to provide a concentrated, tight, non-turbulent flame for best results.

The burner terminates in an insulated chamber (42) having a pedestal (44) connected to a lowering mechanism (not shown) upon which the crystal (46) is grown.

In operation, feed gases of hydrogen, oxygen, and ozone are supplied to the burner and ignited. Ozone can be introduced to the burner alone or in an admixture with oxygen through inlet (18) and passed through inner tube (22), or through inlet (38) and passed through outer tube (34). The refractory metal oxide powder is mixed with dopants such as chromium oxide and neodymium oxide if desired, passed through center tube (22) of the burner and onto pedestal (44) to form a sintered cone measuring one-half inch in diameter at the base and three-eighths inch in height. The flame temperature is gradually increased until a small molten top forms on the sintered cone. The molten region is held in a fixed position with respect to the end of the burner by lowering the pedestal at a rate approximating the linear growth rate of the crystal. The diameter of the crystal is increased by gradually increasing the flame temperature and size. Single crystals of high melting point having a diameter in excess of three-fourths inch and a length in excess of 1 inch may be prepared by this method.

Pure ozone is not available in tanks and must be generated prior to use. Ozone generators are capable of converting about 2 to 5 percent oxygen to ozone in a single pass. Since higher concentrations are needed for growing crystals in accordance with the present invention, ozone must be generated and stored prior to operation of the process. One system available for storing ozone involves passage of the ozone into a refrigerated tube of silica gel. The ozone is selectively condensed in the cold silica gel at temperatures below −90°C. To recover the ozone during operation of the flame fusion process, warm fluid is pumped around the silica gel tube to vaporize the ozone, and the storage tube is swept with oxygen under reduced pressure.

EXAMPLE 1

Seventy grams of beryllium oxide powder and 1.06 grams of $Cr_2O_3$ powder dopant (comprises powder containing 0.5 stom percent dopant) are mixed by coprecipitation of their sulfates and ignition to the oxide and placed in a powder feed hopper after sieving through a 200 mesh screen. Feed gases are supplied to the burner and ignited. A ceramic pedestal is positioned approximately 1 inch below the end of the burner. The powder is deposited on the pedestal by periodically tapping a feed mechanism and by adjusting the flame temperature to provide sintering. After a sintered cone of powder of approximately one-fourth inch in diameter is deposited on the pedestal, the flame temperature is increased until a small molten tip forms and growth begins on one of the seed crystals in the cone. The molten region is held at a fixed position with respect to the end of the burner by lowering the pedestal at a rate approximating the linear growth of the crystal. A flame temperature of approximately 4,980°F (2,750°C) is used.

The diameter of the crystal is increased by gradually increasing the flame size. A very slow rate of diameter increase is maintained in order to assure single crystal growth. After the desired diameter of approximately 0.25 to 0.50 inch is obtained, growth is continued under fixed conditions until the desired crystal length is obtained.

Typical conditions during growth are gas rates at a pressure of 15 pounds per sq. inch, of 13.0 cubic feet per hour (CFH) inner oxygen, 18.7 CFH outer oxygen mixed with 8.0 CFH ozone, and 79 CFH hydrogen. A linear growth rate of about 0.5 to 2 centimeters per hour is desirable. A single crystal of chrome doped beryllium oxide is produced in this manner, the dopant being present in an amount equal to about 0.50 atom percent of the host material. The crystals so formed are about 0.25 to 0.50 inches in diameter and have a length ranging upwards from about one inch. Single crystals of beryllium oxide containing other rare earth doping ions of ytterium oxide, erbium oxide, and praesodymium oxide can also be grown in this matter.

EXAMPLE 2

Sixty grams of calcium oxide and 3.6 grams of $Nd_2O_3$, both in powdered form, are mixed by coprecipitation of their sulfates and ignition to the oxide and placed in the powder hopper after sieving through a 200 mesh screen. Feed gases are supplied to the burner and ignited. A ceramic pedestal is positioned approximately 1 inch below the end of the burner. Powder is deposited on the pedestal by periodic tapping of the feed mechanism and by adjusting the flame temperature to provide sintering. A flame temperature of approximately 4,700°F is required. After a sintered powder cone is deposited on the pedestal, the flame size is gradually increased until a molten tip is formed. A flame temperature of 4,980°F is required. Using the growth steps outlined in example 1, the crystal is gradually enlarged in diameter and length, while continuing to maintain a coating of sintered powder around the crystal.

Typical conditions during growth are gas flow rates at a pressure of 15 sq. inch of 14.2 CFH inner oxygen, 19.7 CFH outer oxygen mixed with 8.5 CFH ozone, and 84 CFH hydrogen. This results in a linear growth rate of approximately 1.0 centimeter per hour.

While the invention has been described with respect to specific embodiments thereof, it will be obvious to those skilled in the art that many modifications can be made within the scope of the invention as defined by the appended claims.

What is claimed is:

1. A flame fusion process for growing single crystals of refractory metal oxides comprising passing powders of a refractory metal oxide selected from the group consisting of beryllium oxide, magnesium oxide, barium zinconate and calcium oxide through a hydrogen-oxygen flame to form a sintered base of said metal oxide, elevating the temperature of said flame to form a molten tip on said base, and delivering to said flame an oxygen stream including ozone in concentration comprising 1 to 44 mole percent of the oxygen stream while relatively displacing said flame and base to grow a crystal thereon.

2. The process of claim 1 where the refractory metal oxide has a melting point in excess of 2,400°C.

3. The process of claim 1 where the refractory metal oxide contains a dopant from the group consisting of rare earth and chromium oxides.

\* \* \* \* \*

UNITED STATES PATENT OFFICE
CERTIFICATE OF CORRECTION

Patent No. 3,778,234  Dated December 11, 1973

Inventor(s) Carolus Cobb

It is certified that error appears in the above-identified patent and that said Letters Patent are hereby corrected as shown below:

Column 4, line 49, "zinconate" should be -- zirconate --.

Signed and sealed this 16th day of April 1974.

(SEAL)
Attest:

EDWARD M. FLETCHER, JR.
Attesting Officer

C. MARSHALL DANN
Commissioner of Patents